United States Patent
Cho et al.

(10) Patent No.: US 7,361,871 B2
(45) Date of Patent: Apr. 22, 2008

(54) COFFEE MAKER AND MICROWAVE OVEN AND METHOD FOR CONTROLLING THE SAME

(75) Inventors: Wan Je Cho, Masan-si (KR); Dae Sik Kim, Changwon-si (KR); Man Su Park, Changwon-si (KR); Jung Ju Kwon, Changwon-si (KR); Wang Lim Lee, Busan-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/636,545

(22) Filed: Dec. 11, 2006

(65) Prior Publication Data

US 2007/0108193 A1 May 17, 2007

Related U.S. Application Data

(62) Division of application No. 11/000,029, filed on Dec. 1, 2004, now Pat. No. 7,186,960.

(30) Foreign Application Priority Data

Dec. 2, 2003 (KR) ........................ 10-2003-0086717

(51) Int. Cl.
*H05B 6/64* (2006.01)
(52) U.S. Cl. ........................ 219/689; 219/679
(58) Field of Classification Search ............... 219/689, 219/678, 679, 685, 680–682, 736, 739, 752–753, 219/756, 758, 687; 126/273 A; 99/DIG. 14, 99/391; D7/350.1, 350.3, 350.4, 351, 402, D7/405, 406
See application file for complete search history.

(56) References Cited

U.S. PATENT DOCUMENTS 5,028,753 A 7/1991 Shariat
D340,831 S 11/1993 Manabe
5,285,718 A 2/1994 Webster et al.
5,300,743 A 4/1994 Park
D475,236 S 6/2003 Lai et al.
D479,431 S 9/2003 Jung et al.
6,737,620 B2 5/2004 Kim
2002/0060219 A1 5/2002 Rypan
2003/0157227 A1* 8/2003 Leung et al. ............... 426/433

(Continued)

FOREIGN PATENT DOCUMENTS

EP 1217875 6/2002

(Continued)

*Primary Examiner*—Quang Van
(74) *Attorney, Agent, or Firm*—Birch, Stewart, Kolasch & Birch, LLP

(57) ABSTRACT

Coffee maker and microwave oven, and method for controlling the same, the coffee maker and microwave oven including a cabinet forming an exterior, a cooking chamber in the cabinet, an outfit room in the cabinet for mounting various electric components on an inside thereof, a case at one side of the outfit room for mounting a water tank, a heater, a funnel, a water supply pipe, and a water supply tube on an inside thereof for extraction of coffee, a fan for preventing transmission of heat from the heater to the electric components, and a control unit for putting the fan into operation after the extraction of coffee is completed, thereby preventing transmission of heat from the heater to the outfit room.

8 Claims, 4 Drawing Sheets

U.S. PATENT DOCUMENTS

2003/0168446 A1  9/2003  Kim
2005/0115960 A1* 6/2005  Park et al. .................. 219/679

FOREIGN PATENT DOCUMENTS

| EP | 1 343 356 A2 | | 9/2003 |
| JP | 02074220 A | * | 3/1990 |
| JP | 04-324034 | | 11/1992 |
| JP | 4-324034 A | | 11/1992 |
| JP | 04324034 A | * | 11/1992 |
| JP | 06-027167 | | 2/1994 |
| JP | 6-76946 A | | 3/1994 |
| JP | 11-251056 | | 9/1999 |
| WO | WO-2004/083732 A1 | | 9/2004 |

* cited by examiner

COFFEE MAKER AND MICROWAVE OVEN AND METHOD FOR CONTROLLING THE SAME

CROSS-REFERENCE TO RELATED APPLICATIONS

This application is a Divisional of application Ser. No. 11/000,029 filed on Dec. 1, 2004, now U.S. Pat. No. 7,186,960 and for which priority is claimed under 35 U.S.C. § 120; and this application claims priority of Application No. P2003-8617 filed in Korea, Republic of on Dec. 2, 2003 under 35 U.S.C. § 119; the entire contents of all are hereby incorporated by reference.

BACKGROUND OF THE INVENTION

1. Field of the Invention

The present invention relates to coffee maker and microwave ovens, and more particularly, to a coffee maker and microwave oven for preventing transmission of heat to an outfit room, and a method for controlling the same.

2. Discussion of the Related Art

In general, a microwave oven cooks food with intermolecular frictional heat generated as a high frequency wave (about 2,450 MHz) disturbs molecular arrangement of the food.

Because the microwave oven heats the food with the high frequency wave, the microwave oven cannot cook various kinds of food. For an example, coffee people enjoys to drink, cannot be prepared with the microwave oven, to require a coffee maker, separately.

However, presently, as a city grows the denser, leading to have a small residential space, and according to the trend of pursuing practicality, the various necessaries of life, starting from home appliances, are required to be compact, such that the home appliances are required to have, not only the traditional original functions, but also various extra functions.

However, the related art microwave oven can not meet such consumer demands.

SUMMARY OF THE INVENTION

Accordingly, the present invention is directed to a coffee maker and microwave oven, and a method for controlling the same that substantially obviates one or more problems due to limitations and disadvantages of the related art.

An object of the present invention is to provide a coffee maker and microwave oven, and a method for controlling the same which can prevent transmission of heat from heater to an outfit room.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a coffee maker and microwave oven includes a cabinet forming an exterior, a cooking chamber in the cabinet, an outfit room in the cabinet for mounting various electric components on an inside thereof, a case at one side of the outfit room for mounting a water tank, a heater, a funnel, a water supply pipe, and a water supply tube on an inside thereof for extraction of coffee, a fan for preventing transmission of heat from the heater to the electric components, and a control unit for putting the fan into operation after the extraction of coffee is completed.

Preferably, the coffee maker and microwave oven further includes a temperature senor provided to an inside of the outfit room for measuring a temperature of the outfit room.

Preferably, the temperature sensor includes a thermistor of which internal resistance changes according to a temperature.

Preferably, the coffee maker and microwave oven further includes holes in the body case in communication with an outside of the cabinet for discharging heat from the heater.

Preferably, the holes are formed adjacent to the case.

Preferably, the holes are formed by lancing.

Preferably, the fan is mounted on a rear surface of the case.

Preferably, the fan blows air to the cooking chamber.

Preferably, there are two fans, one of which blows air to the cooking chamber, and the other one blows air to the case.

In another aspect of the present invention, a method for controlling a coffee maker and microwave oven having a coffee maker unit and a microwave oven unit, includes the steps of determining whether a coffee extraction order is received or not, putting a heater into operation, if the coffee extraction order is received, determining whether extraction of coffee is completed or not, and putting a fan into operation for cooling down an outfit room when the extraction of coffee is completed.

Preferably, the method further includes the step of extracting coffee after the step of putting a heater into operation.

Preferably, the method further includes the step of stopping the heater after the step of determining whether extraction of coffee is completed or not.

Preferably, the method further includes the step of measuring a temperature of the outfit room after the step of putting a fan into operation.

Preferably, the method further includes the step of stopping the fan when the temperature of the outfit room is below a preset temperature after the step of measuring a temperature of the outfit room.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
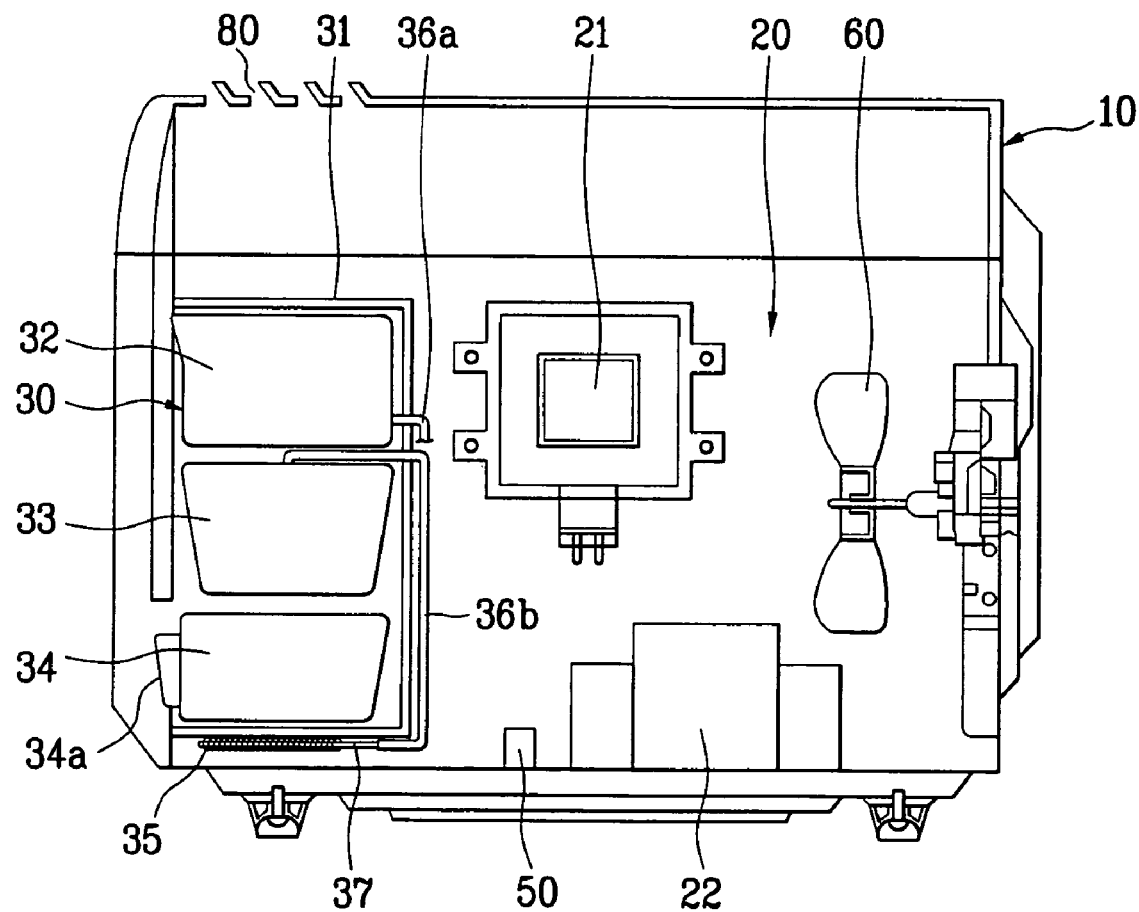
FIG. 1 illustrates a section of a coffee maker and microwave oven in accordance with a preferred embodiment of the present invention.
Figure 2:
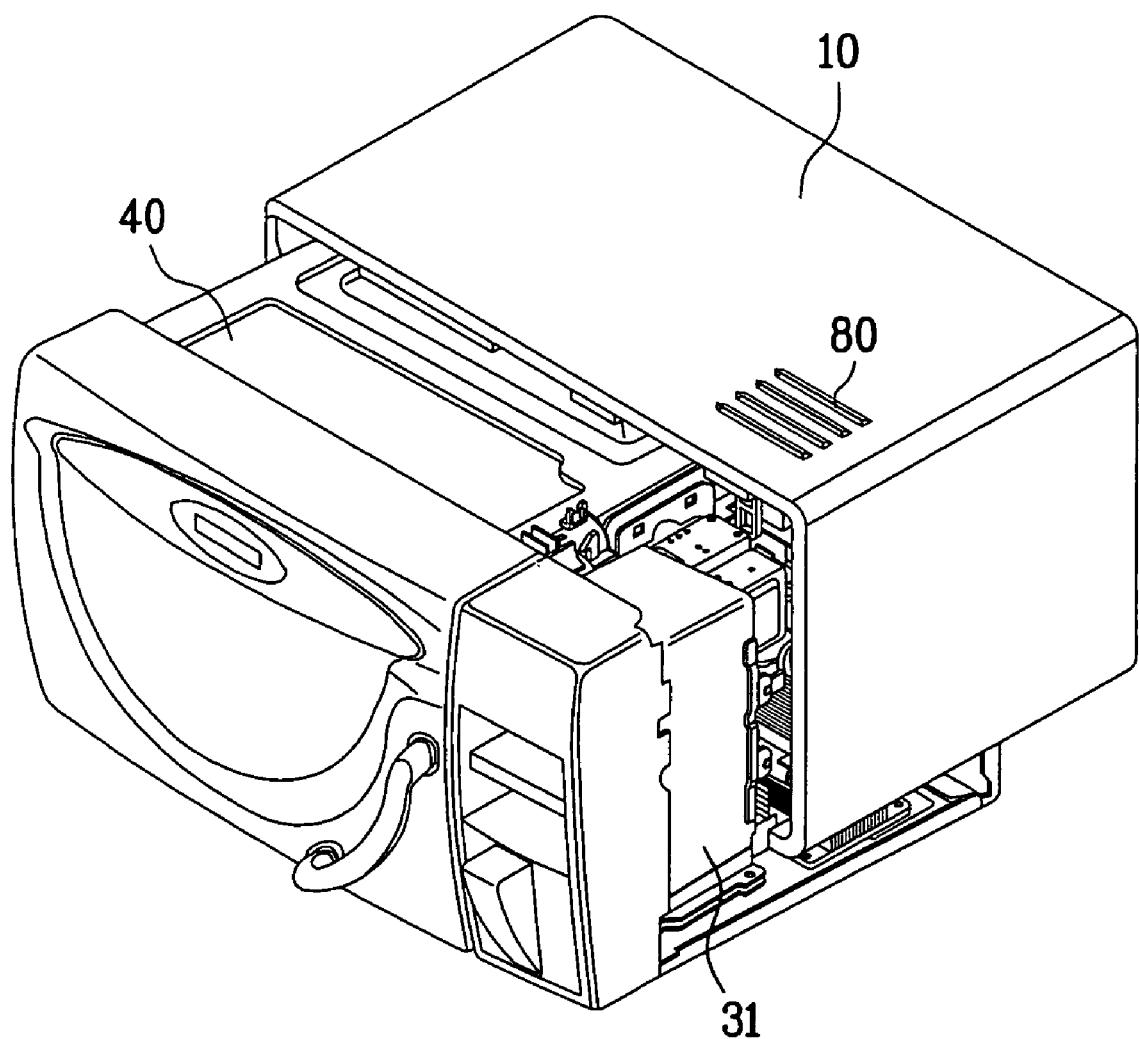
FIG. 2 illustrates a perspective view of a coffee maker and microwave oven in accordance with a preferred embodiment of the present invention.
Figure 3:
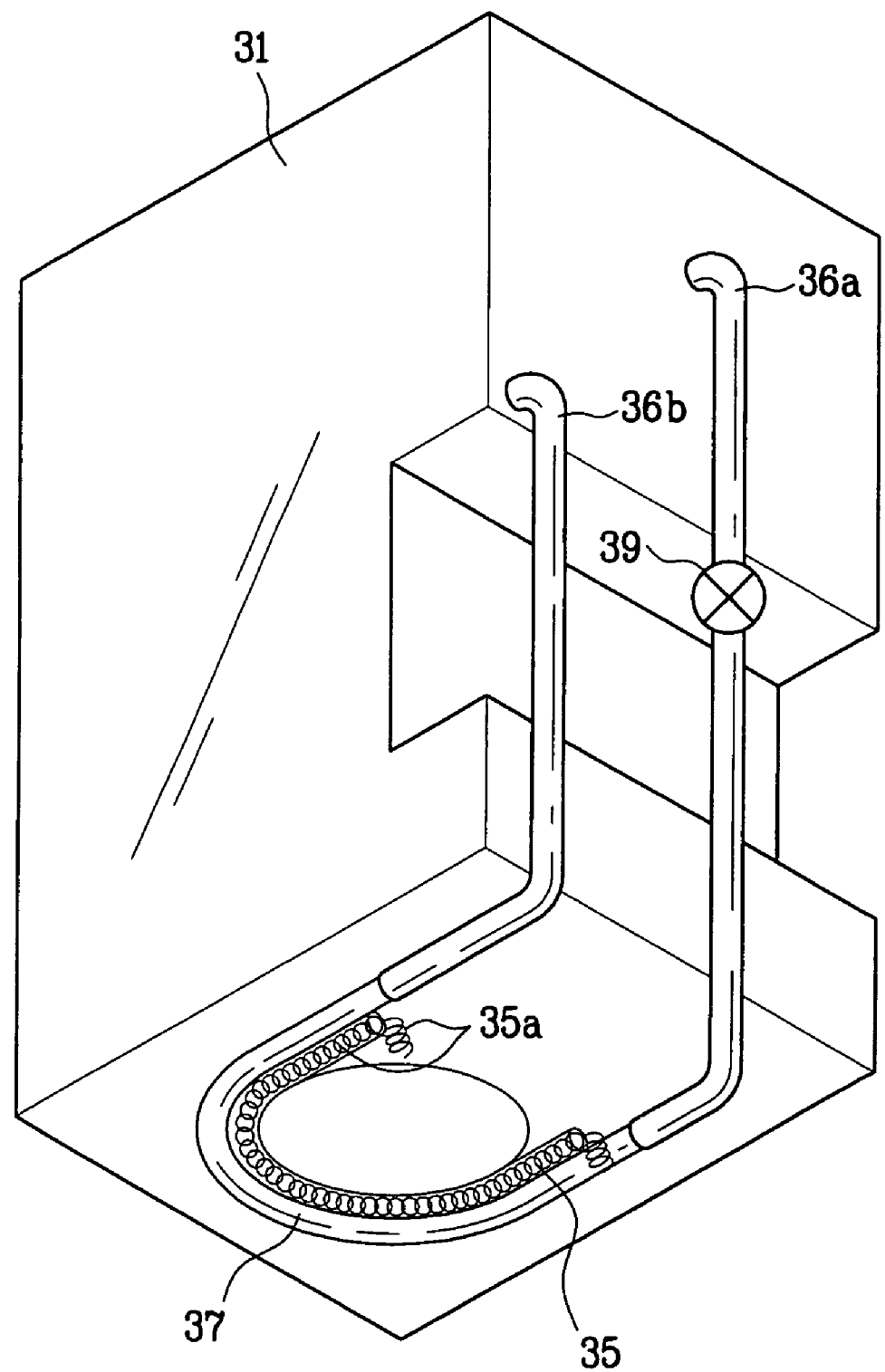
FIG. 3 illustrates a perspective view of a coffee maker unit in a coffee maker and microwave oven in accordance with a preferred embodiment of the present invention.

Referring to FIGS. 1, 2 and 3, the coffee maker and microwave oven includes a cabinet 10 forming an exterior, an outfit room 20 in the cabinet 10, a coffee maker unit 30 at one side of the outfit room 20, a fan 60, and a control unit 100.

Moreover, the cabinet has a cooking chamber 40. That is, the cabinet is divided into the cooking chamber 40, and the outfit room. In the outfit room 20, there are various electric parts, such as a magnetron 21, a high voltage transformer 22, a temperature sensor 50, and a fan 60.

The magnetron 21 receives an external high voltage power, and generates a microwave, and the high voltage transformer 22 transforms external power to high voltage power, before application to the magnetron 21. The magnetron 21 makes water molecules of food in the cooking chamber 40 to vibrate, for cooking of food.

The temperature sensor 50 is provided to the outfit chamber 20, for measuring a temperature T of the outfit room 20. It is preferable that the temperature sensor 50 is a thermistor of which internal resistance varies with a temperature. The temperature sensor 50 is adjacent to a case 31 to be described later. The function of the temperature sensor 50 will be described in detail, later.

In order to protect electric components against heat, the fan 60 is provided to the outfit room 20. The fan 60 will be described in detail, later.

The coffee maker unit 30 includes a case 31 at one side of the outfit room 20, a water tank 32, a funnel 33, water supply pipes 36a, and 36b, a water tube 37, a heater tube 35, and a water supply valve 39.

The case 31 forms an exterior of the coffee maker unit 30, and the water tank 32 at an upper portion of the case 21 for storing potable water. The funnel 33 under the water tank 32 has a filter (not shown) for extracting coffee.

In more detail, the funnel 33 has a shape of a cone having a great upper inside diameter, and a small lower inside diameter. On an inside of the funnel 33, there is a filter (not shown) of paper of non-woven fabric placed on an inside, on which coffee powder is filled.

Therefore, when hot potable water is supplied to the funnel 33, the coffee powder is dissolved in the water, and coffee solution passes through the filter and drops downward. For this, under the funnel 34, there is a drop hole (not shown) in a bottom of the funnel 34 for enabling the coffee solution to drop downward.

In the meantime, under the funnel 33, there is a jug 34 as a container for storing coffee. The jug 34 has an opened top with a hand grip 34a at one side.

Accordingly, by gripping the hand grip 34a, the user can put the jug 34 inside of the case 31, or take the jug 34 out of the case 31, easily. In general, the jug 34 is formed of transparent glass or plastic for the user to see a level of the coffee in the jug.

The water supply pipes 36a, and 36b supply the potable water from the water tank 32 to the funnel 33. The water supply pipes 36a, and 36b have a first pipe 36a connected to the water tank 32, and a second pipe 36b for supplying potable water to the funnel 33, directly.

The water supply tube 37 is mounted on a bottom of the case 31, and has one end connected to the first pipe 36a, and the other end connected to the second pipe 36b. Therefore, the potable water in the water tank 32 is supplied to the funnel 33 through the first pipe 36a, the water supply tube 37, and the second pipe 36b.

The heater tube 35 is in contact with the water supply tube 37, and has a heater 35a provided therein. Upon putting the coffee maker unit 30 into operation, the heater 35a generates heat at a high temperature, to heat the potable water passing through the water supply tube 37.

According to this, the potable water guided to the water supply tube 37 through the first pipe 36a is heated by the heater 35a and supplied to the funnel 33 via the second pipe 36b.

It is preferable that the water supply tube 37 is formed of a material having a good heat conductivity for smooth conduction of heat from the heater 35a. In detail, it is preferable that the water supply tube 37 is formed of ceramic.

Moreover, the heater 35a also heats the jug 34 placed on the bottom of the case 31. Therefore, the coffee in the jug 34 always maintains a warm state by the heat from the heater 35a.

In the meantime, the heat is also transmitted from the heater to the outfit room 20, leading to damage electric components, such as the magnetron 21 and the high voltage transformer 22. In order to prevent this, as described before, the fan 60 is provided to an inside of the outfit room 20. The fan 60 blows air toward the case 31.

In more detail, the fan 60 is mounted on a rear surface of the outfit room 20. The electric components are mounted in front of the fan 60, and the case 31 is mounted in front of the electric components.

The fan 60 blows air toward the electric components in the outfit room 20, to cool down the electric components. The fan 60 also blows air toward the case 31, to prevent air heated by the heater 35a from coming close to the electric components.

The fan can also blow air to the cooking chamber 40 for preheating the cooking chamber 40 before starting cooking, or cooling the cooking chamber 40 after cooking is finished. Moreover, two fans may be provided for better air blowing efficiency. In this instance, one fan blows air to the cooking chamber 40, and the other fan blows air to the case 31.

In the meantime, the coffee maker and microwave oven includes an input unit (not shown) for applying an order and a control unit 100 for carrying out the order. The coffee maker and microwave oven further includes a display unit (not shown) for the user to know states, such as a remained cooling time period, and so on.

A coffee extraction order for the coffee maker unit and a cooking order for the microwave oven unit can be applied to the input unit (not shown). The input unit (not shown) is mounted on a front of the cabinet 10 for user's convenient access.

In the meantime, the control unit 100 is mounted on an inside of the cabinet 10. The control unit 100 controls the electric components for carrying out the user's order. In more detail, the control unit 100 controls the magnetron 21, the high voltage transformer 22, and so on, for carrying out the cooking order, and controls the heater 35a, the water supply valve 39, and so on, to carry out the coffee extraction order.

Moreover, the control unit 100 puts the fan 60 into operation for preventing transmission of heat from the heater 35a to the electric components. It is preferable for the control unit 100 to put the fan 60 into operation when extraction of coffee is finished.

The control unit 100 compares a temperature T of the outfit room 20 measured at the temperature sensor 50 to a preset temperature, to determine whether to put the fan 60 into operation, or to stop the fan 60. The preset temperature is determined within a range which gives no damage to the electric components when the temperature T of the outfit room 20 is maintained at the preset temperature.

In the meantime, in order to prevent transmission of the heat from the heater 35a to the electric components, the cabinet 10 has holes 80 for discharging heat from the cabinet 10. As shown in FIG. 1, the holes 80 may be in an upper surface, side surface, or bottom surface.

It is preferable that the holes 80 are formed by lancing for easy processing. As shown, the holes 80 may be opened in a front of the coffee maker and microwave oven. However, for not discharging heat toward the user, it is preferable that the holes 80 are opened in a rear of the coffee maker and microwave oven.

Figure 4:
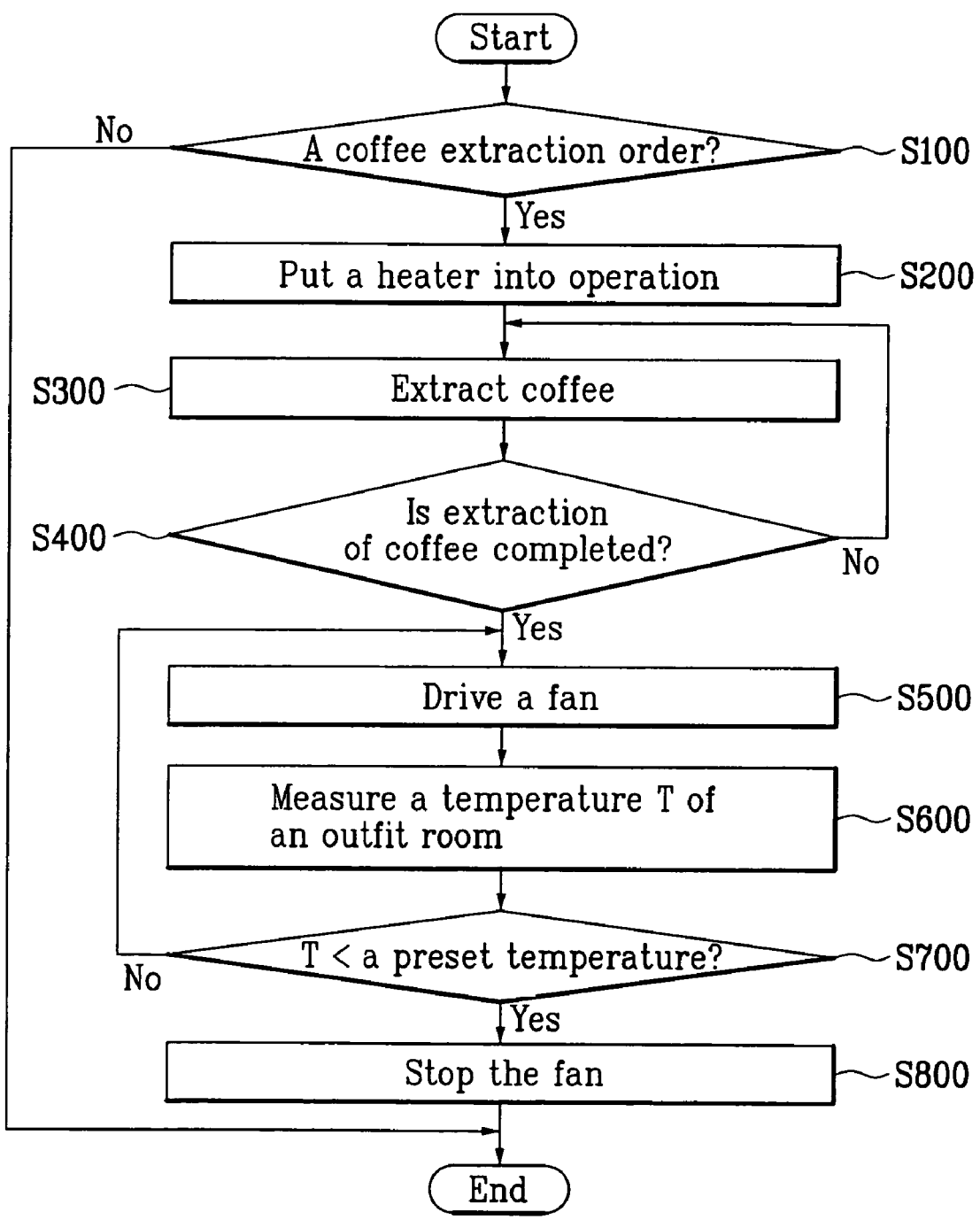
FIG. 4 illustrates a flow chart showing the steps of a method for controlling a coffee maker and microwave oven in accordance with a preferred embodiment of the present invention.

FIG. 4 illustrates a flow chart showing the steps of a method for controlling a coffee maker and microwave oven in accordance with a preferred embodiment of the present invention. A method for controlling a coffee maker and microwave oven in accordance with a preferred embodiment of the present invention will be described, with reference to FIG. 4.

The control unit 100 determines if the user applies a coffee extraction order (S100). In this instance, the user applies the order to the input unit (not shown) of the coffee maker and microwave oven.

When the user applies the coffee extraction order, the control unit opens the water supply valve 39, to supply potable water from the water tank 32 to the water supply tube 37. In this instance, the potable water is supplied to the water supply tube 37 via the first pipe 36a.

The control unit also puts the heater 35a into operation. According to this, the potable water passing through the water supply tube 37 is heated by the heater (S200).

The potable water heated by the heater 35a flows to the funnel 133 via a second pipe. Once coffee is made at the funnel 33, the coffee is extracted to the jug 34 (S300).

Then, the control unit 100 determines completion of coffee extraction (S400). The control unit 100 calculates an amount of water supply, or an operation time period, or the like, to determine the completion of coffee extraction. The control unit 100 may determine completion of coffee extraction by other methods.

Upon completion of extraction of coffee, the control unit (not shown) puts the fan 60 into operation (S500), for preventing transmission of heat from the heater 35a to the electric components.

Also, the control 100 senses the temperature of the outfit room 20 measured at the temperature sensor 50 at the outfit room 20, periodically (S600). The control unit 100 compares the temperature of the outfit room 20 to the preset temperature, and determines whether the fan 60 is put into operation or not (S700).

If the temperature T of the outfit room 20 is lower than the preset temperature, the control unit 100 stops the fan 60 (S800). If the temperature T of the outfit room 20 is higher than the preset temperature, the control unit 100 proceeds to S500. That is, the control unit 100 keeps operation of the fan 60.

As has been described, the coffee maker and microwave oven, and the method for controlling the same of the present invention prevents the electric components suffering from damage caused by heat generated at the time of extraction of coffee, thereby improving reliability of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a coffee maker and microwave oven having a coffee maker unit and a microwave oven unit, comprising the steps of:
   determining whether a coffee extraction order is received or not;
   putting a heater into operation, if the coffee extraction order is received;
   determining whether extraction of coffee is completed or not; and
   putting a fan into operation for cooling down an outfit room when the extraction of coffee is completed.

2. The method as claimed in claim 1, further comprising the step of extracting coffee after the step of putting a heater into operation.

3. The method as claimed in claim 1, further comprising the step of stopping the heater after the step of determining whether extraction of coffee is completed or not.

4. The method as claimed in claim 1, further comprising the step of measuring a temperature of the outfit room after the step of putting a fan into operation.

5. The method as claimed in claim 4, further comprising the step of stopping the fan when the temperature of the outfit room is below a preset temperature after the step of measuring a temperature of the outfit room.

6. A method for controlling a microwave oven having a coffee maker unit and a magnetron, the magnetron being located in an outfit room of the microwave oven, the method comprising the steps of:
   extracting coffee when a coffee extraction order is received; and
   turning on a fan to cool down the outfit room after the extraction step is completed.

7. The method as claimed in claim 6, further comprising the step of measuring a temperature of the outfit room after the step of operating the fan.

8. The method as claimed in claim 7, further comprising the step of stopping the fan when the temperature of the outfit room is below a preset temperature after the step of measuring the temperature of the outfit room.

* * * * *